BINARY ADDER-SUBTRACTER WITH COMMAND CARRY CONTROL

Filed Dec. 19, 1956

INVENTOR
WALTER C. LANNING
BY R. J. Craddock
ATTORNEY

United States Patent Office 2,933,252

Patented Apr. 19, 1960

2,933,252

BINARY ADDER-SUBTRACTER WITH COMMAND CARRY CONTROL

Walter C. Lanning, Plainview, N.Y., assignor to Sperry Rand Corporation, a corporation of Delaware Application December 19, 1956, Serial No. 629,257

16 Claims. (Cl. 235—176)

This invention relates to binary digital computers, and more particularly to computing devices for arithmetically operating on a pair of binary digital numbers in order to yield a binary digital number which differs from one number of the pair by the other number of the pair.

In the operation of addition or subtraction on two binary digital numbers in the series mode, the two numbers are considered digit by digit beginning with the least significant digit and a separate operation of addition or subtraction is performed on each pair of corresponding digits in order to yield a resulting binary digital number which differs from one of the two numbers by the other of the two numbers. While performing the operation of addition on the $n$th order corresponding digits of the two numbers, the carry digit from the addition operation of the $(n-1)$th order corresponding digits must be included to obtain the correct result, whereas while performing the operation of subtraction on the $n$th order corresponding digits of the two numbers, the borrow digit from the subtraction operation of the $(n-1)$th order corresponding digits must be included.

For serial operation, a binary digital number may be represented by a temporal train of discrete intelligence elements, wherein each digit in the number is denoted by a corresponding type signal in the intelligence element corresponding to that digit. For example, electrical pulse type signals may be utilized wherein the presence of an electrical pulse denotes the number 1, and the absence of a pulse denotes the number 0. In order to perform the previously mentioned arithmetic operations on two binary digital numbers, so represented, a computing device must properly combine corresponding signals of the two input signal trains representing the numbers. Furthermore, the computing device must combine in the operation a signal representing the transfer digit from the immediately preceding digit operation; that is, the carry digit for addition and the borrow digit for subtraction. The output from the computing device must be the desired train of signals representing a binary digital form a number which differs from the first number by the second number. In the case of addition the computing device must also generate an output train of signals representing the carry term of the two numbers being added, and in the case of subtraction the computing device must also generate an output train of signals representing the borrow term of the two numbers being subtracted. The computing device must also provide means for storing the output transfer digit signal and for releasing it for use in the next succeeding operation on the next higher order corresponding digits in the two input signal trains.

Heretofore it has been the practice in computing devices which selectively perform the operations of addition or subtraction on a pair of binary digital numbers to generate a pair of signals representing respectively the carry digit and the borrow digit and to selectively apply one of the signal pair to a storage means where it may be released for use in the next succeeding operation on the next higher order corresponding digits of the binary digital number pair. Such computing devices require two continuously operating independent computing channels, one to generate a signal train representing the carry term and one to generate a signal train representing the borrow term, and a rapidly operating selecting apparatus to direct the output transfer term signal train of the selected channel to the storage means. However any unnecessary logical operations and any unnecessary equipment without some compensating advantages are undesirable in a computer because they increase the probability of error and the probability of equipment failure.

It is therefore an object of this invention to provide a binary digital computing device simpler and more dependable than analogous prior art computing devices.

It is a further object of this invention to provide an improved binary digital computing device for minimizing the handling of transfer term information.

It is a further object of this invention to provide an improved computing device for selectively performing the operation of addition or subtraction on a pair of binary digital numbers.

It is a further object of this invention to provide an improved circuit for generating the transfer term in a binary digital computing device adapted to selectively perform the operations of addition or subtraction.

The foregoing objects are achieved in this invention by providing a novel transfer term generating circuit. Two signals are applied to the generating circuit, one representing a pseudo carry digit or pseudo borrow digit of corresponding digits of the input number pair and the output transfer digit of the immediately preceding arithmetic operation, and the other representing an Equivalence logical operation on a digit of one of the input number pair and the output transfer digit of the immediately preceding arithmetic operation. The transfer term generator performs selective logical operations on said pseudo carry digit or pseudo borrow digit signals and delivers an output signal representing the carry digit or the borrow digit of said input number pair.

Thus in the practice of this invention separate carry and borrow term signals need not be generated, but instead, only a pseudo carry digit or pseudo borrow digit signal is generated, the pseudo digit signal being selectively converted to the required carry or borrow digit signals.

The invention will be described with reference to the accompanying drawings wherein.

Figure 1:
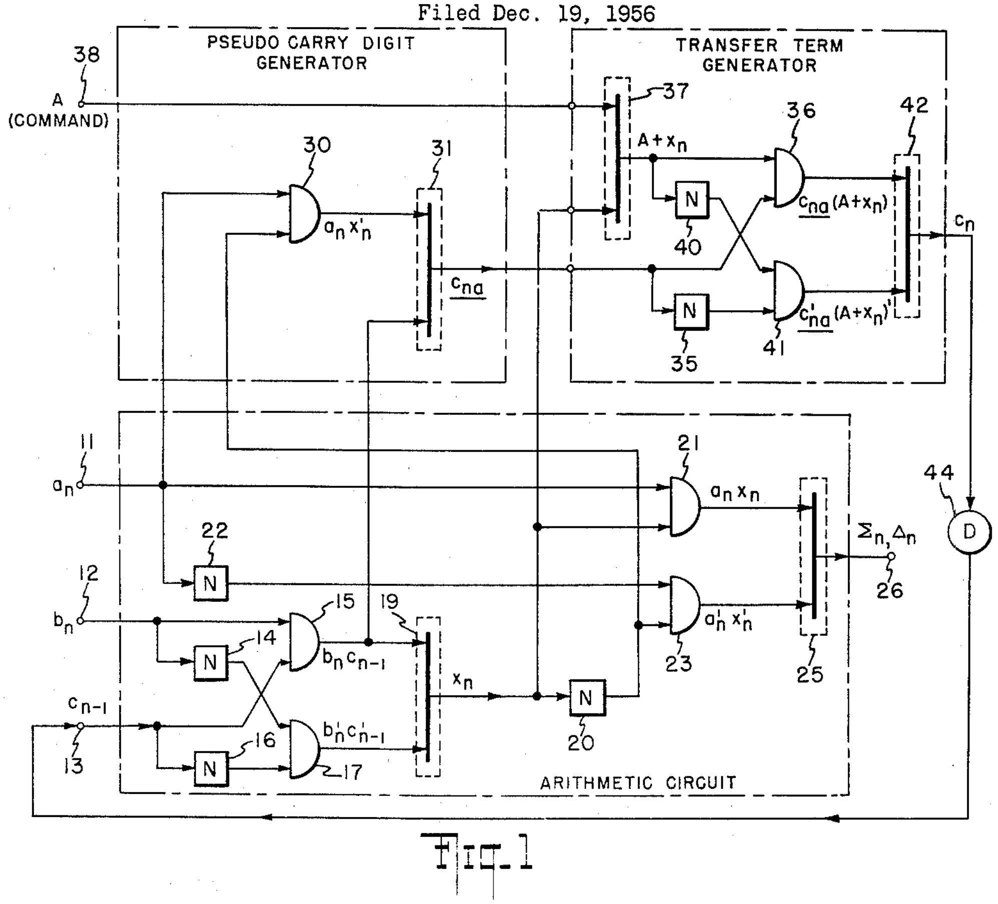
Fig. 1 is a logical diagram of the binary digital arithmetic computer of this invention.

In the following description and claims certain of the logical operations which are peculiarly applicable to binary digital logical operations may be defined as follows:

AND yields a 1 out if all the inputs are 1. This operation is performed by an AND-gate.

| M \ N | 0 | 1 |
|---|---|---|
| 0 | 0 | 0 |
| 1 | 0 | 1 |

OR yields a one out if any input is 1. This operation is performed by an OR-gate.

| M \ N | 0 | 1 |
|---|---|---|
| 0 | 0 | 1 |
| 1 | 1 | 1 |

Equivalence yields a 1 out if the inputs are alike. This operation is performed by an Equivalence logical element.

| M \ N | 0 | 1 |
|---|---|---|
| 0 | 1 | 0 |
| 1 | 0 | 1 |

NOT yields the opposite digit or number of the digit input. The NOT logical element operates on a single binary digital number. Thus, if the input to a NOT logical element is 1, the output is 0 and vice versa.

The following definition is adopted for use in this application.

Transfer—a word generic to both carry and borrow.

Logical operations will be expressed herein in logical or Boolean alegbra employing the well known and generally accepted symbolism wherein a primed term represents the logical NOT of the term, a plus (+) represents the logical OR, and adjunction of terms with no sign therebetween indicates the logical AND between the adjoining terms. For example, the expression $A'+B'$ is read "not A or not B," and the expression A'B' is read "not A and not B," while the expression $$A'(BC'+B')+(A+B)'$$

is read "[(not A) and {(B and not C) or not B}] or not (A or B)."

To arithmetically operate on a pair of binary digital numbers in order to yield a binary digital number which differs from one number of the pair by the other number of the pair, the numbers must be considered digit by digit, beginning with the least significant digits and the proper operation performed on each pair of corresponding digits. In the addition of the $n$th order corresponding digits of the two numbers, the carry digit from the addition operation of the $(n-1)$th order corresponding digits is included to obtain the correct result, whereas in the subtraction of the $n$th order corresponding digits of the two numbers the borrow digit from the subtraction operation of the $(n-1)$th order corresponding digits is included to obtain the correct result. Thus, the operations of addition and subtraction on two binary digital numbers in the series mode must conform to the following truth table:

| | $a_n$ | $b_n$ | $c_{n-1}$ | $\Sigma_n, \Delta_n$ | $c_{na}$ | $c_{ns}$ |
|---|---|---|---|---|---|---|
| 1 | 0 | 0 | 0 | 0 | 0 | 0 |
| 2 | 1 | 0 | 0 | 1 | 0 | 0 |
| 3 | 0 | 1 | 0 | 1 | 0 | 1 |
| 4 | 1 | 1 | 0 | 0 | 1 | 0 |
| 5 | 0 | 0 | 1 | 1 | 0 | 1 |
| 6 | 1 | 0 | 1 | 0 | 1 | 0 |
| 7 | 0 | 1 | 1 | 0 | 1 | 1 |
| 8 | 1 | 1 | 1 | 1 | 1 | 1 |

In this table $a_n$ and $b_n$ represent $n$th order corresponding digits of the pair of numbers $a$, $b$ on which the arithmetic operation is to be performed. In the case of subtraction, $a_n$ is a digit of the minued and $b_n$ is a digit of the subtrahend. The term $c_n-1$ represents the output transfer digit from the preceding arithmetic operation performed on the $(n-1)$th order corresponding digits of the number pair $a$, $b$ and the $(n-2)$th order output transfer digit. The sum term digit is represented by $\Sigma_n$ and the difference term digit by $\Delta_n$, these digits being alike in binary digital arithmetic for given $a_n$, $b_n$, and $c_{n-1}$ digits. The carry digit for addition is designated $c_{na}$ and the borrow digit for subtraction is designated $c_{ns}$. These two transfer digits having the subscript "$n$" are used in arithmethically operating on the $(n+1)$th order corresponding digits of the number pair $a$, $b$.

In order to construction a computer which will perform the operations demanded by the truth table it is necessary to generate a sum term digit $\Sigma_n$ or a difference term digit $\Delta_n$ for each operation on the $n$th order corresponding digits of the numbers $a$ and $b$. The logical diagram of a circuit which is adapted to receive two input signal trains representing a pair of binary digital numbers in serial form and a third signal train representing the output transfer digit of the immediately preceding arithmetic operation, and to produce an output signal train representing respectively the sum term or the difference term of said binary digital number pair, according to whether said third signal train represents the carry term or the borrow term, is shown, in the dotted box "Arithmetic Circuit" of Fig. 1. A pair of signal trains representing respectively the binary digital numbers $a$ and $b$ are applied to respective input terminals 11 and 12. A third signal train representing the delayed output transfer term is applied to an input terminal 13. Input terminal 12 is connected to the parallel-connected input terminal of a NOT logical element 14 and one input terminal of an AND-gate 15. Input terminal 13 is connected to the parallel-connected input terminal of a NOT logical element 16 and the other input terminal of AND-gate 15. The output terminals of NOT logical elements 14 and 16 are connected to respective input terminals of an AND-gate 17. The signal available at the output terminal of AND-gate 15 represents the logical operation $b_nc_{n-1}$, which is read "$b_n$ and $c_{n-1}$." The signal available at the output terminal of AND-gate 17 represents the logical operation $b_n'c_{n-1}'$, which is read "not $b_n$ and not $c_{n-1}$." The output terminals of AND-gates 15 and 17 are connected to respective input terminals of an OR-gate 19. The signal available at the output terminal or OR-gate 19 represents the following logical operation on corresponding digits of the signals applied to input terminals 12 and 13:

$$b_nc_{n-1}+b_n'c_{n-1}'=x_n \quad (1)$$

The logical operation expressed by Equation 1 represents an Equivalence operation on the digits $b_n$ and $c_{n-1}$.

The output terminal of OR-gate 19 is connected to the parallel-connected input terminal of a NOT logical element 20 and one input terminal of an AND-gate 21. Input terminal 11 is connected to the parallel-connected other input terminal of AND-gate 21 and the input terminal of a NOT logical element 22. The output terminals of NOT logical elements 20 and 22 are connected to respective input terminals of an AND-gate 23. The signal available at the output terminal of AND-gate 21 represents the logical operation $a_nx_n$. The signal available at the output terminal of AND-gate 23 represents the logical operation $a_n'x_n'$. The output terminals of AND-gates 21 and 23 are connected to respective input terminals of an OR-gate 25. The signal available at the output terminal 26 of OR-gate 25 represents respectively the sum term or the difference term of the binary digital numbers $a$, $b$ according to whether the transfer term digit $c_{n-1}$ represents the carry term digit or the borrow term digit. The logical operation represented by the output signal of OR-gate 25 is given by the following expression:

$$a_nx_n+a_n'x_n'=\Sigma_n,\Delta_n \quad (2)$$

Equation 2 represents the fourth column of the truth table and may be interpreted to indicate the conditions under which $\Sigma_n$ or $\Delta_n$ equals 1 for the proper combination of input digits $a_n$, $b_n$, $c_{n-1}$, as represented by the rows of the truth table.

A pseudo carry digit is generated in the portion of Fig. 1 enclosed in the dotted box "Pseudo Carry Digit Generator." The pseudo carry digit represents the logical operation on the three digits applied as signals to respective input terminals 11, 12 and 13 as shown in the fifth column of the truth table; that is, if these three digits correspond to a row in the truth table that indicates a 1 in he fifth column, a signal representing a 1 will be produced by the pseudo carry digit generator. This is true whether or not the transfer term digit $c_{n-1}$ represents a borrow term digit or a carry term digit. Thus, the pseudo carry digit is equal to the true carry digit when the circuit of Fig. 1 is performing the opeation of addition, but is equal to neither a true carry digit nor a true borrow digit during the operation of subtraction.

Input terminal 11 is connected to one input terminal of an AND-gate 30. The output terminal of NOT logical element 20 is connected to the other input terminal of AND-gate 30. The signal available at the output terminal of AND-gate 30 represents the logical operation $a_n x_n'$. The output terminal of AND-gate 30 is connected to one input terminal of an OR-gate 31. The output terminal of AND-gate 15 is connected to the other input terminal of OR-gate 31. The signal available at the output terminal of OR-gate 31 represents the aforementioned pseudo carry digit operation on the input digits $a_n$, $b_n$, and $c_{n-1}$ and is given by the following equation:

$$\underline{c_{na}} = a_n x_n' + b_n c_{n-1} \quad (3)$$

wherein the subscribing bar represents a pseudo signal.

Consider now the logical conditions under which the borrow digit and the carry digit are alike for a given set of input digits to the computer; i.e., rows 1, 2, 7 and 8 of the truth table. An expression which formulates these logical conditions is:

$$c_{ns} = c_{na}[a_n' b_n' c_{n-1}' + a_n b_n' c_{n-1}' + a_n' b_n c_{n-1} + a_n b_n c_{n-1}] \quad (4)$$

This equation may be read, for example, for the first term in the parentheses as: when $a_n$ is not 1, $b_n$ is not 1, and $c_{n-1}$ is not 1 the borrow digit is equal to the carry digit.

Equation 4 may be reduced to:

$$c_{ns} = c_{na}[b_n c_{n-1} + b_n' c_{n-1}'] = c_{na} x_n \quad (5)$$

where $x_n$ is given by Equation 1.

Similarly, an equation for the logical conditions under which the borrow digit is unlike the carry digit for a given set of input digits to the computer (rows 3, 4, 5 and 6 of the truth table) is as follows:

$$c_{ns} = c_{na}'[bc_{n-1}' + b_n' c_{n-1}] = c_{na}' x_n' \quad (6)$$

The borrow digit may be expressed completely in terms of the carry digit from Equations 5 and 6 as:

$$c_{ns} = \underline{c_{na}} x_n + \underline{c_{na}}' x_n' \quad (7)$$

It must be recognized, however, in Equation 7 that if a true borrow digit is to be produced for a subtraction operation, $c_{na}$ can only be a pseudo carry digit, since the term $c_{n-1}$ in Equations 4, 5, and 6 is the borrow digit. The fact that $c_{na}$ is a pseudo carry term is indicated by the subscribing bars in the equations. Equation 7 indicates that a borrow digit signal may be derived from a signal representing a pseudo carry digit.

In a device to add or subtract a pair of binary digital numbers, it is necessary to command that the carry term be generated for addition and the borrow term for subtraction. An equation indicating the output transfer term $c_n$ for such a device is:

$$c_n = Ac_{na} + A' c_{ns} \quad (8)$$

where A is the command signal for addition; i.e. $A=1$ when the device is to perform the operation of addition.

Substituting Equation 7 into Equation 8 there is obtained an equation for the output transfer term as a function of the carry digit, $$c_n = A\underline{c_{na}} + A'(\underline{c_{na}} x_n + \underline{c_{na}}' x_n') \quad (9)$$

Subscribing a bar below $c_{na}$ in Equation 8 is proper, as the pseudo carry digit and the true carry digits are equal during the operation of addition. Equation 9 may be reduced to $$c_n = \underline{c_{na}}(A + x_n) + \underline{c_{na}}'(A + x_n)' \quad (10)$$

Equation 10 is the logical equation expressing the operation of the Transfer Term Generator of Fig. 1. In the embodiment of Fig. 1, a pseudo carry digit is always generated as a logical operation from the input digits. However, only when the command is for addition ($A=1$) does the output transfer term represent the carry term for the input numbers $a$ and $b$. When the command is for subtraction ($A=0$), the output transfer term represents the borrow term for the input numbers $a$ and $b$.

The Transfer Term Generator shown in a separate dotted box in Fig. 1 receives three input signals, one representing the pseudo carry digit, one representing the Equivalence operation on the digits $b_n$ and $c_{n-1}$ and one representing the command. The output terminal of OR-gate 31 is connected to the parallel-connected input terminal of a NOT logical element 35 and one input terminal of an AND-gate 36. The output terminal of OR-gate 19 is connected to one input terminal of an OR-gate 37. The command signal representing a binary digit is applied to input terminal 38. Input terminal 38 is connected to the other input terminal of OR-gate 37. The output terminal of OR-gate 37 is connected to the parallel-connected input terminal of a NOT logical element 40 and the other input terminal of AND-gate 36. The output terminals of NOT logical elements 35 and 40 are connected to respective input terminals of an AND-gate 41. The signal available at the output terminal of AND-gate 36 represents the logical operation $\underline{c_{na}}(A+x_n)$. The signal available at the output terminal of AND-gate 41 represents the logical operation $\underline{c_{na}}'(A+x_n)'$. The output terminals of AND-gates 36 and 41 are connected to respective input terminals of an OR-gate 42. The signal available at the output terminal of OR-gate 42 represents the carry term or the borrow term of the binary digital number pair $a$, $b$, according to whether the command signal represents a unit digit or a zero digit. For purposes of this description the signal available at the output terminal of OR-gate 42 is designated generically as the output transfer term signal and is either the output carry term signal or the output borrow term signal. The output transfer term signal is generated from the input signals applied to the Transfer Term Generator in accordance with the logical operation expressed in Equation 10. The computing circuit of Fig. 1 performs the operations of either addition or subtraction, while producing internal thereto the pseudo carry digit for both conditions, this carry digit being converted to a carry term digit or a borrow term digit by the proper command signal applied to the Transfer Term Generator.

The output signal of OR-gate 42 is applied to a delay element 44 which delays the signal for a sufficient time that it may be applied to input terminal 13 simultaneously with the next higher order digit signals of the input numbers $a$ and $b$.

Although the device of Fig. 1 produces an output transfer term as a function of the carry digit, it is within the scope of this invention to provide an alternative computing device in which the output transfer term is a function of a pseudo borrow digit.

Similarly to the pseudo carry digit, the pseudo borrow digit represents the logical operation on the three digits applied as signals to respective input terminals 11, 12, and 13 as shown in the sixth column of the truth table. The pseudo borrow digit is equal to the true borrow digit when the computer is performing the operation of addition, but is equal to neither a true borrow digit nor a true carry digit during the operation of addition.

A logical equation for the output transfer term as a function of the pseudo borrow digit is:

$$c_n = \underline{c_{ns}}(S+x_n) + \underline{c_{ns}}'(S+x_n)' \qquad (11)$$

where S is the command signal for subtraction; i.e. $S=1$ when the device is to perform the operation of subtraction. Equation 11 is the logical equation expressing the operation of the alternative embodiment of the computer of this invention employing the circuits of Figs. 2 and 3 in place of the respective Pseudo Carry Digit Generator and Transfer Term Generator of Fig. 1.

Figure 2:
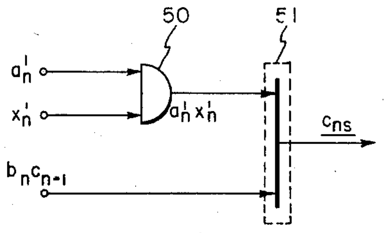
Fig. 2 is a logical diagram of an alternative pseudo transfer digit generator for use with the computer of Fig. 1.

Three input signals are provided for the pseudo borrow digit generator of Fig. 2. Signals representing the NOT of the number $a$ and the NOT of the Equivalence operation on the digits $b_n$ and $c_{n-1}$ are applied to respective input terminals of an AND-gate 50. The signal available at the output terminal of AND-gate 50 represents the logical operation $a_n'x_n'$. The output terminal of AND-gate 50 is connected to one input terminal of an OR-gate 51. A signal representing the logical operation $b_nc_{n-1}$ is applied to the other input terminal of OR-gate 51. The signal available at the output terminal of OR-gate 51 represents the pseudo borrow digit of the computer circuit input digits $a_n, b_n$, and $c_{n-1}$. This pseudo borrow digit is given by the following equation $$\underline{c_{ns}} = b_nc_{n-1} + a_n'x_n' \qquad (12)$$

Figure 3:
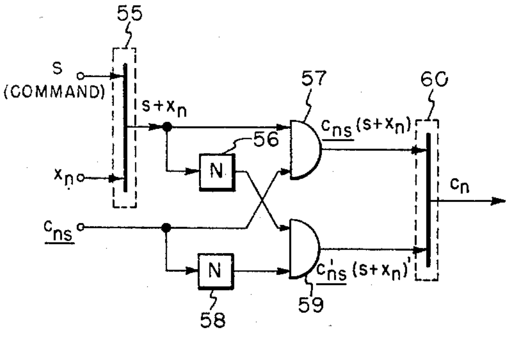
Fig. 3 is a logical diagram of an alternative transfer term generator for use with the device of Fig. 2.

The circuit of Fig. 3 receives three input signals representing respectively the subtraction command S, an Equivalence operation on the digits $b_n$ and $c_{n-1}$, and the pseudo borrow digit of OR-gate 51. The command signal and the signal representing the Equivalence operation are applied to respective input terminals of an OR-gate 55. The output terminal of OR-gate 55 is connected to the parallel-connected input terminal of a NOT logical element 56 and one input terminal of an AND-gate 57. The pseudo borrow digit signal is applied to the parallel-connected input terminal of a NOT logical element 58 and the other input terminal of AND-gate 57. The output terminals of NOT logical elements 56 and 58 are connected to respective input terminals of an AND-gate 59. The signal available at the output terminal of AND-gate 57 represents the logical operation $\underline{c_{ns}}(S+x_n)$. The signal available at the output terminal of AND-gate 59 represents the logical operation $\underline{c_{ns}}'(S+x_n)'$. The output terminals of AND-gates 57 and 59 are connected to the respective input terminals of an OR-gate 60. The signal available at the output terminal of OR-gate 60 represents the output transfer term of the computing circuit. This output transfer term represents the output borrow term or the output carry term according to whether the command signal digit represents a 1 or a 0. The logical operation represented by the output signal of OR-gate 60 is given by Equation 11.

Equations 10 and 11 may be expressed generically by the following equation:

$$C_n = e(G+X_n) + e'(G+X_n)' \qquad (13)$$

wherein, depending on whether a pseudo carry or pseudo borrow digit is used, $e$ is $\underline{c_{na}}$ or $\underline{c_{ns}}$, and G is A or S.

The AND-gates and OR-gates of the above described computing circuit may be mechanized by means known in the art, such as by electronic circuits or magnetic core logical circuits. Similarly the NOT logical elements may be mechanized by several well known means, such as by inverter amplifiers.

It is not essential to this invention that an arithmetic circuit of the type shown in Fig. 1 be employed. Any circuit for generating the sum term or the difference term digits may be used in conjunction with the transfer term generator of this invention. If the Equivalence term is not generated as one step in the arithmetic circuit of the system employed, a separate logical circuit for generating the Equivalence term may be employed.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. In a digital computer circuit for performing an arithmetic operation on a first binary digital number by a second binary digital number to yield a binary digital number differing from said first number by said second number, each of said numbers being represented serially by a signal train, a circuit for generating an output transfer term signal comprising a first OR-gate having a pair of input terminals and an output terminal, command means for applying a command signal representing a binary digit to one input terminal of said first OR-gate, an Equivalence logical generator for producing at an output terminal a signal representing an Equivalence logical operation on a digit of said second number and the output transfer term digit of the immediately preceding arithmetic operation, means for connecting said Equivalence generator output terminal to the other input terminal of said first OR-gate, first and second NOT logical elements each having an input and an output terminal, means for connecting the output terminal of said first OR-gate to the input terminal of said first NOT logical element, a pseudo carry digit generator for producing at an output terminal a signal representing carry digit logic for corresponding digits of said first and second numbers and said output transfer term digit of the immediately preceding arithmetic operation, means for connecting said pseudo carry digit generator output terminal to the input terminal of said second NOT logical element, first and second AND-gates each having a pair of input terminals and an output terminal, means for connecting said pseudo carry digit generator output terminal to one input terminal of said first AND-gate, means for connecting the output terminal of said first OR-gate to the other input terminal of said first AND-gate, means for connecting each output terminal of said first and second NOT logical elements to a respective input terminal of said second AND-gate, a second OR-gate having a pair of input terminals and an output terminal, and means for connecting each output terminal of said first and second AND-gates to a respective input terminal of said second OR-gate, whereby the signal available at the output terminal of said second OR-gate represents the carry term of said first and second numbers when said command signal represents unity and represents the borrow term of said first and second numbers when said command signal represents zero.

2. In a digital computer circuit for performing an arithmetic operation on a first binary digital number by a second binary digital number to yield a binary digital number differing from said first number by said second number, each of said numbers being represented serially by a signal train, a circuit for generating an output transfer term signal comprising a first OR-gate having a pair of input terminals and an output terminal, command means for applying a command signal representing a binary digit to one input terminal of said first OR-gate, an Equivalence logical generator for producing at an output terminal a signal representing an Equivalence logical operation on a digit of said second number and the output transfer term digit of the immediately preceding arithmetic operation, means for connecting said Equivalence generator output terminal to the other input terminal of said first OR-gate, first and second NOT logical elements each having an input and an output terminal, means for connecting the output terminal of said first OR-gate to the input terminal of said first NOT logical element, a pseudo borrow digit generator for producing at an output terminal a signal representing borrow digit logic for corresponding digits of said first and second numbers and said output transfer term digit of the immediately preceding arithmetic operation, means for connecting said pseudo borrow digit generator output terminal to the input terminal of said second NOT logical element, first and second AND-gates each having a pair of input terminals and an output terminal, means for connecting said pseudo borrow digit generator output terminal to one input terminal of said first AND-gate, means for connecting the output terminal of said first OR-gate to the other input terminal of said first AND-gate, means for connecting each output terminal of said first and second NOT logical elements to a respective input terminal of said second AND-gate, a second OR-gate having a pair of input terminals and an output terminal, and means for connecting each output terminal of said first and second AND-gates to a respective input terminal of said second OR-gate, whereby the signal available at the output terminal of said second OR-gate represents the borrow term of said first and second numbers when said command signal represents unity and represents the carry term of said first and second numbers when said command signal represents zero.

3. In a digital computer circuit for performing an arithmetic operation on a first binary digital number by a second binary digital number to yield a binary digital number differing from said first number by said second number, each of said numbers being represented serially by a signal train, a circuit for generating an output carry or borrow transfer term signal in response to a command signal comprising a first OR-gate having a pair of input terminals and an output terminal, command means for applying a command signal representing a binary digit to one input terminal of said first OR-gate, an Equivalence logical generator for producing at an output terminal a signal representing an Equivalence logical operation on a digit of said second number and the output transfer term digit of the immediately preceding arithmetic operation, means for connecting said Equivalence generator output terminal to the other input terminal of said first OR-gate, first and second NOT logical elements each having an input and an output terminal, means for connecting the output terminal of said first OR-gate to the input terminal of said first NOT logical element, a pseudo transfer digit generator for producing at an output terminal a signal representing transfer digit logic for corresponding digits of said first and second numbers and said output transfer term digit of the immediately preceding arithmetic operation, means for connecting said pseudo transfer digit generator output terminal to the input terminal of said second NOT logical element, first and second AND-gates each having a pair of input terminals and an output terminal, means for connecting said pseudo transfer digit generator output terminal to one input terminal of said first AND-gate, means for connecting the output terminal of said first OR-gate to the other input terminal of said first AND-gate, means for connecting each output terminal of said first and second NOT logical elements to a respective input terminal of said second AND-gate, a second OR-gate having a pair of input terminals and an output terminal, and means for connecting each output terminal of said first and second AND-gates to a respective input terminal of said second OR-gate, whereby the signal available at the output terminal of said second OR-gate represents the carry term of said first and second numbers when said command signal represents one binary digit and represents the borrow term of said first and second numbers when said command signal represents the other digit.

4. Apparatus for generating an output transfer term signal for use with a digital computer circuit, which digital computer circuit performs an arithmetic logical operation on a first binary digital number by a second binary digital number to yield a binary digital number differing from said first number by said second number, each of said numbers being represented serially by a signal train, and which computer circuit has means for producing as an intermediate step in said logical operation an Equivalence signal representing an Equivalence operation on a digit of said second number and the output transfer term digit of the immediately preceding logical operation, and which circuit has means for producing a signal representing transfer digit logic for corresponding digits of said first and second numbers and said output transfer term digit of the immediately preceding arithmetic operation, said apparatus comprising a first OR-gate having a pair of input terminals and an output terminal, means for applying said Equivalence signal to one input terminal of said first OR-gate, first and second NOT logical elements each having an input and an output terminal, means for connecting the output terminal of said first OR-gate to the input terminal of said first NOT logical element, means for applying the signal representing said transfer digit logic to the input terminal of said second NOT logical element, first and second AND-gates each having a pair of input terminals and an output terminal, means for applying said transfer digit logic signal to one input terminal of said first AND-gate, means for connecting the output terminal of said first OR-gate to the other input terminal of said first AND-gate, means for connecting each output terminal of said first and second NOT logical elements to a respective input terminal of said second AND-gate, a second OR-gate having a pair of input terminals and an output terminal, and means for connecting each output terminal of said first and second AND-gates to a respective input terminal of said second OR-gate, whereby the signal available at the output terminal of said second OR-gate represents the carry term of said first and second numbers when a signal representing one binary digit is applied to the other input terminal of said first OR-gate and represents the borrow term of said first and second numbers when a signal representing the other binary digit is applied to said other input terminal of the first OR-gate.

5. A circuit for generating an output transfer term signal as in claim 4 wherein the signal representing transfer digit logic produced in said digital computer circuit represents carry digit logic for corresponding digits of said first and second numbers and said output transfer term digit of the immediately preceding arithmetic operation.

6. A circuit for generating an output transfer term signal as in claim 4 wherein the signal representing transfer digit logic produced in said digital computer circuit represents borrow digit logic for corresponding digits of said first and second numbers and said output transfer term digit of the immediately preceding arithmetic operation.

7. A circuit for generating an output transfer term signal as in claim 4 further including delay means, means for applying the output signal of said second OR-gate to said delay means and means for applying the delayed output signal of said delay means to said computer circuit, whereby said computer circuit receives simultaneously signals representing digits of said first number, said second number and said carry or borrow term.

8. A digital computer for performing an arithmetic operation on a first binary digital number by a second binary digital number to yield a binary digital number differing from said first number by said second number, said first and second numbers being represented by respective first and second signals, comprising means responsive to said first and second signals and to a third signal representing the transfer term of said first and second numbers for producing an output representing the sum term of corresponding order digits of said first and second numbers and the transfer term digit of an arithmetic operation involving the immediately preceding order digits, means responsive to said first, second, and third signals for producing signal information representing transfer term logic on corresponding digits of said first number and said second number, and the immediately preceding transfer term digit, and means for producing said third signal in response to a command signal, to said signal information and to equivalence of a digit of said second number with the transfer term digit of the arithmetic operation involving the immediately preceding order digits, said equivalence including at least the case where the equal digits are 0's, said third signal representing the carry term of said first and second numbers when said command signal represents one binary digit and representing the borrow term of said first and second numbers when said command signal represents the other binary digit.

9. In a digital computer circuit for performing an arithmetic operation on a first binary digital number by a second binary digital number to yield a binary digital number differing from said first number by said second number, and which computer circuit has means for producing signal information representing transfer digit logic for corresponding order digits $a$ and $b$ respectively of said first and second numbers and the output transfer term digit $c$ of a preceding arithmetic operation: means for logically operating on said digits $b$ and $c$ to produce a logical output responsive to equivalence of $b$ and $c$, said equivalence including at least the case where $b=c=$binary 0, and means responsive to said signal information, said logical output, and a command signal for generating a transfer term appropriate to said arithmetic operation.

10. The apparatus claimed in claim 9 including means for feeding the latter transfer term back to said computer circuit, and means for delaying the latter transfer term to involve it in an arithmetic operation on the following order digits.

11. In a digital computer circuit for performing an arithmetic operation on a first binary digital number by a second binary digital number to yield a binary digital number differing from said first number by said second number, and which computer circuit has means for producing signal information representing transfer digit logic for corresponding digits $a$ and $b$ respectively of said first and second numbers and the output transfer term digit $c$ of a preceding arithmetic operation; means for logically operating on said digits $b$ and $c$ to produce a logical output corresponding to the Boolean algebraic expression $bc+b'c'$ wherein a primed term represents the logical NOT of the term, the plus (+) represents the logical OR, and adjunction of terms with no sign therebetween indicates the logical AND between the adjoining terms, and means responsive to said signal information, said logical output, and a command signal for generating a transfer term appropriate to said arithmetic operation.

12. In a digital computer circuit for performing an arithmetic operation on a first binary digital number by a second binary digital number to yield a binary digital number differing from said first number by said second number, and which computer circuit has means for producing signal information representing transfer digit logic for corresponding digits $a$ and $b$ respectively of said first and second numbers and the output transfer term digit $c$ of the immediately preceding arithmetic operation: means for logically operating on said digits $b$ and $c$ to produce a logical output corresponding to the Boolean algebraic expression $bc+b'c'$ wherein a primed term represents the logical NOT of the term, the plus (+) represents the logical OR, and adjunction of terms with no sign therebetween indicates the logical AND between the adjoining terms, and means responsive to said signal information, said logical output, and a command signal for generating a transfer term which represents the carry term of said first and second numbers when said command signal represents one binary digit and represents the borrow term of said first and second numbers when said command signal represents the other digit.

13. The apparatus claimed in claim 12 including means for feeding the latter transfer term back to said computer circuit, and means for delaying the latter transfer term to involve it in an arithmetic operation on the following order digits.

14. In a digital computer circuit for performing an arithmetic operation on a first binary digital number by a second binary digital number to yield a binary digital number differing from said first number by said second number, and which computer circuit has means for producing a signal $e$ representing transfer digit logic for corresponding digits $a$ and $b$ respectively of said first and second numbers and the output transfer term digit $c$ of a preceding arithmetic operation; means for logically operating on said digits $b$ and $c$ to produce a logical output $X_n$ corresponding to the Boolean algebraic expression $bc+b'c'$, and a logical equivalence circuit responsive to said signal $e$, said logical output $X_n$, and a command signal G for generating a transfer term corresponding to the Boolean algebraic expression $$e(G+X_n)+e'(G+X_n)'$$

said expressions employing the symbolism of Boolean algebra wherein a primed term represents the logical NOT of the term, a plus (+) represents the logical OR, and adjunction of terms with no sign therebetween indicates the logical AND between the adjoining terms.

15. A digital computer for performing an arithmetic operation on a first binary digital number by a second binary digital number to yield a third binary digital number differing from said first number by said second number, said first and second numbers being represented by respective first and second signals, comprising means responsive to said first and second signals and to a third signal representing the transfer term of said first and second numbers for producing an output representing the sum term of corresponding order digits of said first and second numbers and the transfer term digit of an arithmetic operation involving the immediately preceding order digits, means responsive to said first, second, and third signals for producing signal information representing transfer term logic on corresponding digits $a$ and $b$ respectively of said first number and said second number, and the immediately preceding transfer term digit $c$, means responsive to said digits $b$ and $c$ for producing a logical output corresponding to the Boolean algebraic expression $bc+b'c'$ wherein a primed term represents the logical NOT of the term, the plus (+) represents the logical OR, and adjunction of terms with no sign therebetween indicates the logical AND between the adjoining terms, and means for producing said third signal in response to a command signal, to said signal information and to said logical output.

16. A digital computer for performing an arithmetic operation on a first binary digital number by a second binary digital number to yield a third binary digital number differing from said first number by said second number, said first and second numbers being represented by respective first and second signals comprising means responsive to said first and second signals and to a third signal representing the transfer term of said first and second numbers for producing an output representing the sum term of corresponding order digits of said first and second numbers and the transfer term digit of an arithmetic operation involving the immediately preceding order digits, means responsive to said first, second, and third signals for producing signal information representing transfer term logic on corresponding digits *a* and *b* respectively of said first number and said second number, and the immediately preceding transfer term digit *c*, means responsive to said digits *b* and *c* for producing a logical output corresponding to the Boolean algebraic expression $bc+b'c'$ wherein a primed term represents the logical NOT of the term, the plus (+) represents the logical OR, and adjunction of terms with no sign therebetween indicates the logical AND between the adjoining terms, and means for producing said third signal in response to a command signal, to said signal information and to said logical output, said third signal representing the carry term of said first and second numbers when said command signal represents one binary digit and representing the borrow term of said first and second numbers when said command signal represents the other binary digit.

References Cited in the file of this patent

FOREIGN PATENTS

| | | |
|---|---|---|
| 1,044,678 | France | June 24, 1953 |
| 706,457 | Great Britain | Mar. 31, 1954 |
| 707,784 | Great Britain | Apr. 21, 1954 |

OTHER REFERENCES

Richards: "Arithmetic Operations in Digital Computers," copyrighted 1955, pages 121 to 124, and 129 relied on.

UNITED STATES PATENT OFFICE

Certificate of Correction

April 19, 1960

Patent No. 2,933,252

Walter C. Lanning

It is hereby certified that error appears in the above numbered patent requiring correction and that the said Letters Patent should read as corrected below.

Column 1, line 53, for "a binary" read —in binary—; column 3, line 70, for "minued" read —minuend—; column 4, line 8, for "construction" read —construct—; line 38, the equation should appear as shown below instead of as in the patent—

$$b'_n c'_{n-1}$$

line 43, for "or" read —of—; line 45, the equation should read as shown below instead of as in the patent—

$$b_n c_{n-1} + b'_n c'_{n-1} = x_n$$

line 60, the equation should appear as shown below instead of as in the patent—

$$a'_n x'_n$$

line 70, the equation should appear as shown below instead of as in the patent—

$$a_n x_n + a'_n x'_n = \Sigma_n, \Delta_n$$

column 5, line 8, for "he" read —the—; line 13, for "opeation" read —operation—; line 21, the equation should read as shown below instead of as in the patent—

$$a_n x'_n$$

line 29, the equation should appear as shown below instead of as in the patent—

$$\underline{c_{na}} = a_n x'_n + b_n c_{n-1},$$

lines 37 and 38, the equation should appear as shown below instead of as in the patent—

$$c_{ns} = c_{na}[a'_n b'_n c'_{n-1} + a_n b'_n c'_{n-1} + a'_n b_n c_{n-1} + a_n b_n c_{n-1}]$$

line 45, the equation should appear as shown below instead of as in the patent—

$$c_{ns} = c_{na}[b_n c_{n-1} + b'_n c'_{n-1}] = c_{na} x_n$$

line 52, the equation should appear as shown below instead of as in the patent—

$$c_{ns} = c'_{na}[b c'_{n-1} + b'_n c_{n-1}] = c'_{na} x'_n$$

column 6, line 4, the equation should appear as shown below instead of as in the patent—

$$c_n = A\underline{c_{na}} + A'(\underline{c_{na}} x_n + \underline{c'_{na}} x'_n)$$

line 10, the equation should appear as shown below instead of as in the patent—

$$c_n = \underline{c_{na}}(A + x_n) + \underline{c'_{na}}(A + x_n)'$$

line 40, the equation should appear as shown below instead of as in the patent—

$$\underline{c'_{na}}(A + x_n)'$$

line 46, for "unit" read —unity—; column 7, line 5, the equation should read as shown below instead of as in the patent—

$$c_n = \underline{c_{ns}}(S + x_n) + \underline{c'_{ns}}(S + x_n)'$$

line 20, the equation should appear as shown below instead of as in the patent—

$$a'_n x'_n$$

line 29, the equation should appear as shown below instead of as in the patent—

$$\underline{c_{ns}} = b_n c_{n-1} + a'_n x'_n$$

line 49, the equation should appear as shown below instead of as in the patent—

$$\underline{c'_{ns}}(S + x_n)'$$

Signed and sealed this 9th day of May 1961.

[SEAL]

Attest:
ERNEST W. SWIDER,
*Attesting Officer.*

DAVID L. LADD,
*Commissioner of Patents.*